US010650982B2

(12) United States Patent
Jung et al.

(10) Patent No.: US 10,650,982 B2
(45) Date of Patent: May 12, 2020

(54) NANOWIRE SUPERCAPACITORS AND METHOD OF MANUFACTURE

(71) Applicant: University of Central Florida Research Foundation, Inc., Orlando, FL (US)

(72) Inventors: Yeonwoong Jung, Oviedo, FL (US); Nitin Choudhary, Orlando, FL (US); Jayan Thomas, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 15/836,338

(22) Filed: Dec. 8, 2017

(65) Prior Publication Data

US 2018/0166223 A1   Jun. 14, 2018

Related U.S. Application Data (60) Provisional application No. 62/431,616, filed on Dec. 8, 2016.

(51) Int. Cl.
*H01G 11/00* (2013.01)
*H01G 11/28* (2013.01)
(Continued)

(52) U.S. Cl.
CPC ............ *H01G 11/28* (2013.01); *H01G 11/24* (2013.01); *H01G 11/36* (2013.01); *H01G 11/48* (2013.01);
(Continued)

(58) Field of Classification Search
CPC .......... H01G 4/008; H01G 4/01; H01G 11/24; H01G 11/28; H01G 11/36; H01G 11/68; H01G 11/86
See application file for complete search history.

(56) References Cited

U.S. PATENT DOCUMENTS

| 2005/0117194 | A1* | 6/2005 | Kim | ................. | B82Y 20/00 |
| | | | | | 359/273 |
| 2006/0088709 | A1* | 4/2006 | Ito | ................. | C04B 35/4682 |
| | | | | | 428/325 |

(Continued)

FOREIGN PATENT DOCUMENTS

WO   WO 2012/112120   * 8/2012

OTHER PUBLICATIONS

Zhou et al (Mesoporous coaxial titanium nitride-vanadium nitride fibers of core-shell structures for high-performance supercapacitors, ACS Applied Materials & Interfaces 2011, 3, 3058-3063.*

(Continued)

*Primary Examiner* — Mark Kopec
(74) *Attorney, Agent, or Firm* — Molly L. Sauter; Smith & Hopen, P.A.

(57) ABSTRACT

A method for the fabrication of h-WO$_3$/WS$_2$ core/shell nanowires and their use in flexible supercapacitor applications. The novel nanowire assemblies exhibit multifold advantages desired for high-performance supercapacitors, including superior material properties and electrode design. The material design principle can be extended to other material systems, implying its great potential for a variety of energy storage devices compatible with emerging flexible and wearable technologies.

9 Claims, 11 Drawing Sheets

(51) Int. Cl.
  *H01G 11/24* (2013.01)
  *H01G 11/68* (2013.01)
  *H01G 11/48* (2013.01)
  *H01G 11/86* (2013.01)
  *H01G 11/36* (2013.01)

(52) U.S. Cl.
  CPC ............ *H01G 11/68* (2013.01); *H01G 11/86* (2013.01); *Y02E 60/13* (2013.01)

(56) References Cited

U.S. PATENT DOCUMENTS

2011/0261502 A1* 10/2011 Gruner .................. H01G 11/02 361/502
2016/0336622 A1* 11/2016 Zhang ................... H01M 4/583

OTHER PUBLICATIONS

Wu et al "Controlled synthesis of MnOOH multilayer nanowires as anode materials for lithium-ion batteries", Materials Characterization 118 (2016) 405-410.*
Salmaoui et al "Characterization of h-WO3 nanorods synthesized by hydrothermal process", Polyhedron 29 (2010) 1771-1775.*
Chen et al., Core-Shell MoO3—MoS2 Nanowires for Hydrogen Evolution: A Functional Design for Electrocatalytic Materials. Nano Lett. 2011. vol. 11: 4168-4175.
Cummins et al., Efficient Hydrogen Evolution in Transition Metal Dichalcogenides via a Simple One-Step Hydrazine Reaction. Nat. Commun. 2016. vol. 7: 11857.
Cummins et al., Catalytic Activity in Lithium-Treated Core-Shell MoOx/MoS2 Nanowires. J. Phys. Chem. C. 2015. vol. 119: 22908-22914.
Bissett et al., Characterization of MoS2-Graphene Composites for High-Performance Coin Cell Supercapacitors. ACS Appl. Mater. Interfaces. 2015. vol. 7: 17388-17398.
Liu et al., the Highly Enhanced Performance of Lamellar WS2 Nanosheet Electrodes upon Intercalation of Single-Walled Carbon Nanotubes for Supercapacitors and Lithium Ions Batteries. Chem. Commun. 2014. vol. 50: 4485-4488.
Hu et al., WS2 Nanoparticles—Encapsulated Amorphous Carbon Tubes: A Novel Electrode Material for Supercapacitors with a High Rate Capability. Electrochem. Commun. 2013. vol. 28: 75-78.
Chen et al., In Situ Nitrogenated Graphene—Few-Layer WS2 Composites for Fast and Reversible Li+ Storage. Nanoscale. 2013. vol. 5: 7890-7896.
Ren et al., Three-Dimensional Tubular MoS2/PANI Hybrid Electrode for High Rate Performance Supercapacitor. ACS Appl. Mater. Interfaces. 2015. vol. 7: 28294-28302.
Li et al., Hierarchical Carbon@Ni3S2@MoS2 Double Core—Shell Nanorods for High-Performance Supercapacitors. J. Mater. Chem. A. 2016. vol. 4: 1319-1325.
Qi et al., A Simple Method for the Synthesis of Highly Oriented Potassium-Doped Tungsten Oxide Nanowires. Adv. Mater. 2003. vol. 15 (No. 5): 411-414.
Choudhary, N. et al., High-Performance One-Body Core/Shell Nanowire Supercapacitor Enabled by Conformal Growth of Capacitive 2D WS2 Layers, ACS Nano 2016, 10, 10726-10735.

* cited by examiner

NANOWIRE SUPERCAPACITORS AND METHOD OF MANUFACTURE

CROSS-REFERENCES TO RELATED APPLICATIONS

This application claims priority to U.S. Provisional Patent Application No. 62/431,616 entitled, "Core/Shell Nanowire Flexible Supercapacitor and Associated Method Of Use", filed on Dec. 8, 2016, which is incorporated by reference in its entirety.

GOVERNMENT INTEREST STATEMENT

This invention was made with government support under grant number ECCS-1351757 awarded by the National Science Foundation (NSF). The government has certain rights in the invention.

BACKGROUND OF THE INVENTION

The ever-increasing consumption of nonrenewable energy sources and global concerns toward environmental protection has compelled scientific communities to search for sustainable energy storage technologies.

Supercapacitors are one of the most promising energy storage devices, as a result of their intrinsic performance advantages. Supercapacitors store energy in terms of charges by either ion adsorption (electrochemical double layer capacitors (EDLCs)) or surface faradic reactions (pseudo-capacitors) on electrodes.

High-performance supercapacitors should be designed to satisfy a set of required properties, such as high specific capacitance, long cyclic stability and large rate capability. The high-power density of supercapacitors over other energy storage systems, such as lithium ion batteries, makes them suitable for a variety of applications where high bursts of power are instantly required, as in electric vehicles and wind turbines. Moreover, their fast charging-discharging and long-term cyclic stabilities make them attractive for power supplies in portable electronic devices. As the advances of mobile/portable devices are progressing to incorporate additional functionalities, as in flexible/wearable energy technologies, it is compelling to develop supercapacitors which deliver high power under mechanical deformations for long time cycles. Performance of supercapacitors can be improved by optimizing the intrinsic properties of electrode materials as well as rationally engineering their electrode designs. From the material properties' perspective, high electronic/ionic conductivities are essential for reducing capacitance losses, particularly at high scan rates/current densities. Accordingly, materials that are electrically conductive (for electron transport), yet structurally nanoporous (for ion transport), are highly desired.

From the electrode designs' perspective, electrodes should be integrated on metal current collectors with mechanically/chemically stable interfaces (ideally, binder-free), which will ensure a long cycle life as well as high electronic/ionic conductivities. Moreover, enlarging the surface area of electrodes will lead to improved specific capacitance owing to the increased amount of charges stored on their surfaces.

Recently, substantive efforts have been focused on developing nanostructured electrode materials to meet the aforementioned requirements by bridging their superior material properties to more efficient electrode designs. For example, an array of electrochemically active one-dimensional (1D) nanowires directly integrated on current collectors can offer multiple advantages. Their large surface areas with small diameters provide facile access and short diffusion paths for electrolyte ions, which can improve capacitances. Moreover, the direct integration of nanowires (active electrode materials) on metallic substrates (current collectors) without the use of binding materials can enhance mechanical robustness while reducing capacitive losses at their interfaces.

In addition to the 1D nanostructures, two-dimensional (2D) transition metal dichalcogenides (TMDs) such as molybdenum disulfide ($MoS_2$) and tungsten disulfide ($WS_2$) have recently being considered as promising capacitive materials due to their structural advantages. For example, the intrinsically layered structure of 2D TMDs enables the facile incorporation of ions in between 2D layers separated by sub-nanometer physical gaps, which favors a fast ionic adsorption/transport through them, which are free to expand. Their large surface area is another contributing factor for enhancing capacitance via the EDLC mechanism.

Despite the projected advantages, most 2D TMDs do not present sufficiently high electrical conductivities, unlike zero-bandgap graphene, which hampers the direct applications of stand-alone 2D TMDs for supercapacitors. Unlike the single materials-based approaches, incorporating multiple 1D and 2D materials with well-defined dimensions and distinct functionalities are anticipated to offer synergic advantages. These efforts include the combination of 2D TMDs with highly conductive carbonaceous 1D or 2D materials as well as conductive polymers, constructing hybrid composites for electrodes. Some demonstrations include 2D $WS_2$ incorporated with 1D carbon nanotubes (CNTs) and reduced graphene oxide (rGO), as well as 2D $MoS_2$ composites with carbons and conductive polymers. Despite enhanced specific capacitance in some cases, these 2D TMDs based composite materials still suffer from limited performances. For example, significant capacitance decays are observed after a few hundred-to-thousand charge-discharge cycles, which are attributed to the poor structural integrity at the interfaces of randomly integrated dissimilar nanomaterials.

Accordingly, 2D TMDs have emerged as promising capacitive materials for supercapacitor devices owing to their intrinsically layered structure and large surface areas. In addition, hierarchically integrating 2D TMDs with other functional nanomaterials has recently been pursued to improve electrochemical performances. However, the supercapacitors known in the art often suffer from limited cyclic stabilities and capacitance losses due to the poor structural integrity at the interfaces of randomly assembled materials.

Accordingly, what is needed in the art is an improved supercapacitor having increased cyclic stability and reduced capacitances loses.

SUMMARY OF INVENTION

In various embodiments, the present invention provides high-performance core/shell nanowire supercapacitors based on an array of one-dimensional (1D) nanowires seamlessly integrated with conformal two-dimensional (2D) transition-metal dichalcogenides (TMD) layers. In the present invention, the 1D and 2D supercapacitor electrodes are spontaneously converted from identical metal current collectors via facile sequential oxidation/sulfurization and as such, the 1D and 2D supercapacitor electrodes possess "one-body" geometry with atomically sharp and structurally robust core/shell interfaces. In the present invention, a supercapacitor is constructed by assembling two identical supercapacitor electrodes prepared in accordance with the method of the present invention.

In one embodiment, the present invention provides a supercapacitor having an array of nanowires fabricated from a metal foil, wherein each of the nanowires of the array includes a nanowire core formed from the metal foil. Each of the nanowires of the array of nanowires further includes a shell surrounding the nanowire core, wherein the shell is formed from the nanowire core and comprises a plurality of separated from each other by a sub-nanometer physical gap.

In a particular embodiment, the metal foil used to form the array of nanowires of the supercapacitor is tungsten (W). In this embodiment, the nanowire core is a highly single-crystalline hexagonal tungsten trioxide (h-$WO_3$) nanowire core and the shell is a 2D tungsten disulfide ($WS_2$) shell. In a specific embodiment, the tungsten foil is about 50 μm thick and is flexible.

In an additional embodiment, the present invention provides a method for preparing a supercapacitor electrode, which includes, chemically converting a metal foil to an array of nanowires, wherein each of the nanowires comprises a nanowire core and a shell surrounding the nanowire core and wherein the shell comprises a plurality of layers separated from each other by a sub-nanometer physical gap.

In a particular embodiment, a method for preparing a supercapacitor electrode in accordance with the present invention may include, chemically converting a tungsten (W) foil to an array of nanowires by oxidizing the W foil to form the nanowire core of each of the nanowires of the array of nanowires and then sulfurizing the nanowire core of each of the nanowires of the array of nanowires to convert the outer surface of each nanowire core to the shell surrounding the nanowire core. In a specific embodiment, the method may result in an array of nanowires having a highly single-crystalline hexagonal tungsten trioxide (h-$WO_3$) nanowire core and a two-dimensional tungsten disulfide ($WS_2$) shell formed on the surface of the W foil.

The hybrid supercapacitors, in accordance with the present invention, outperform any previously developed stand-alone 2D TMD-based supercapacitors. In particular, the supercapacitors of the present invention exhibit an exceptional charge-discharge retention exceeding 30,000 cycles owing to their structural robustness, suggesting great potential for unconventional energy storage technologies.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In various embodiments, the present invention provides high-performance core/shell nanowire supercapacitors based on an array of one-dimensional (1D) nanowires seamlessly integrated with conformal two-dimensional (2D) transition-metal dichalcogenides (TMD) layers.

In one embodiment, the present invention provides novel 1D/2D core/shell nanowires made of 1D hexagonal tungsten trioxide (h-$WO_3$) core and 2D tungsten disulfide shell onto flexible (50 micron thick) W foils, using a simple chemical (oxidation/sulfurization) method. These hybrid materials provide multifold advantages that are desired for high-performance supercapacitors, including: (1) highly dense, vertically aligned nanowires which provide enhanced surface areas for improved adsorption/intercalation of electrolyte ions; (2) a nanowire core that is composed of electrically conductive, highly single-crystalline $WO_3$ for efficient carrier transport; (3) a nanowire shell that is composed of 2D $WS_2$ with sub-nanometer physical gaps (van der Waals gaps) in between individual 2D layers for facile ion absorption from electrolytes; (4) the interfaces of the core/shell and the nanowire/current collector are chemically self-assembled without any binders or extra material depositions, ensuring good structural integrity; and (5) all the constituting components, i.e., core, shell, and current collectors, are converted from one identical material, enabling one-body structures. Synergistic effects of these attributes are confirmed by excellent capacitive performances, particularly, extremely long cycle stability, i.e. 100% capacitance retention after 30,000 cycles of galvanostatic charging and discharging. The solid state device of the present invention exhibits a high energy density of 0.06 $Wh/cm^3$, which is better than many of the state-of-art supercapacitor devices made of other 2D materials, including Li-thin film batteries and electrolytic supercapacitors. The high bendability of the device was tested under repeated bending for more than 100 times and at different bending angles. Substantial capacitance retention after bending tests suggest their use in emerging flexible electronic devices.

Figure 1:
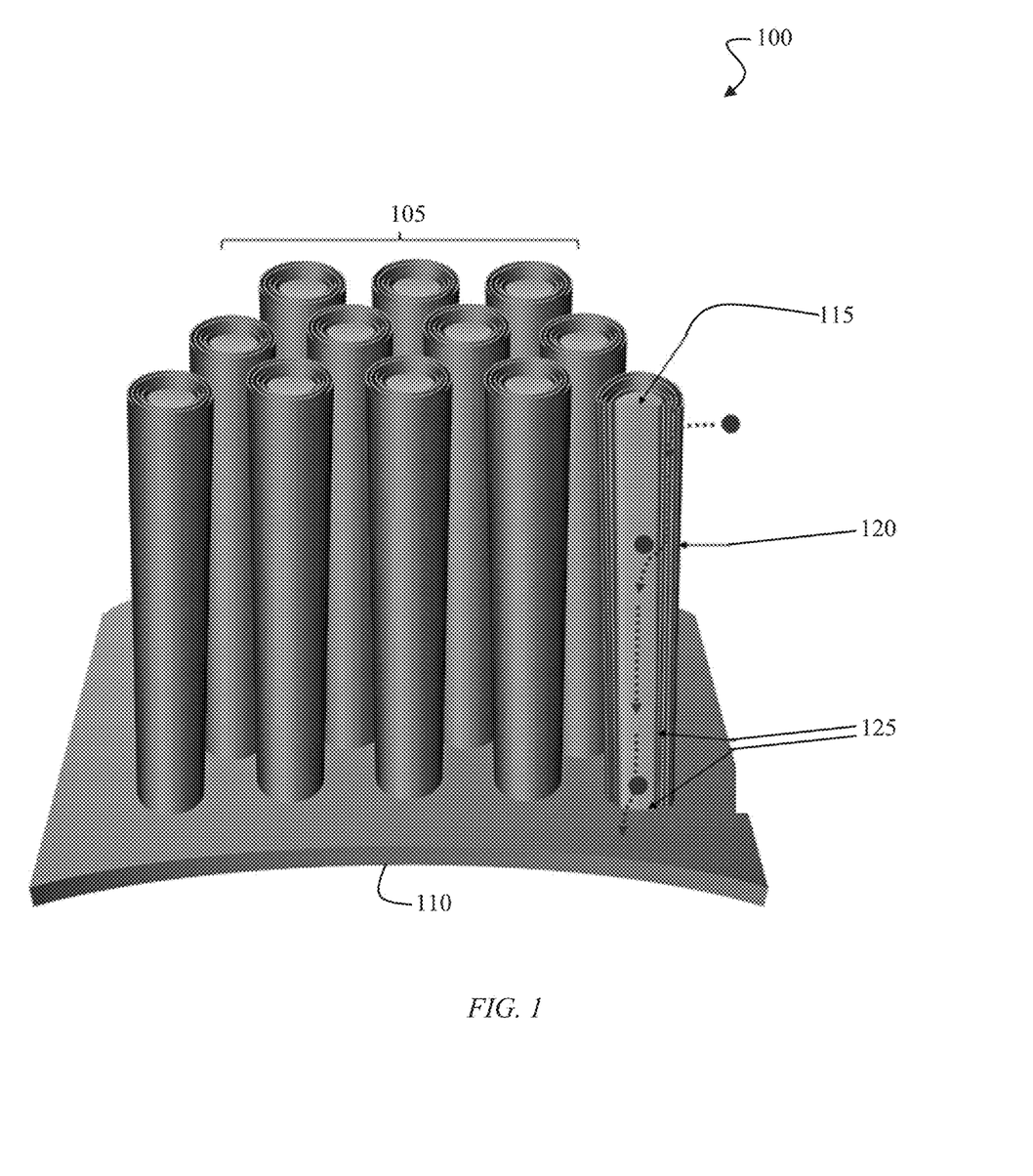
FIG. 1 is a schematic illustration of a one-body array of core/shell nanowire supercapacitor electrode, in accordance with an embodiment of the present invention wherein each constituting component offers distinct functionalities.

FIG. 1 shows an illustration a supercapacitor electrode 100 in accordance with the present invention, which includes a one-body array of 1D/2D core/shell nanowires 105 directly integrated onto a metal current collector 110. Each of the nanowires of the array of nanowires 105 includes a conductive 1D channel for carrier transport 115 and a layered 2D shell 120 for ionic absorption of an electrolyte. As illustrated the nanowire array 105 provides a large surface area for absorption and a seamless interface 125 between the nanowire array 105 and the current collector 110 to provide mechanical robustness.

The presented design 100 offers several distinct advantages which are desirable for high-performance supercapacitors: (1) highly dense, vertically aligned nanowires to provide enhanced surface areas for improved adsorption/intercalation of electrolyte ions; (2) a nanowire core composed of electrically conductive, highly single-crystalline $WO_3$ for efficient carrier transports; (3) a nanowire shell composed of 2D $WS_2$ with sub-nanometer physical gaps (van der Waals gaps) in between individual 2D layers for facile ion absorption from electrolytes; (4) interfaces between the core/shell and the nanowire/current collector are chemically self-assembled without any binders or extra materials depositions, ensuring good structural integrity; and (5) the constituting components, i.e./ core, shell, and current collectors, are converted from one identical material, enabling one-body structures.

Figure 2A:
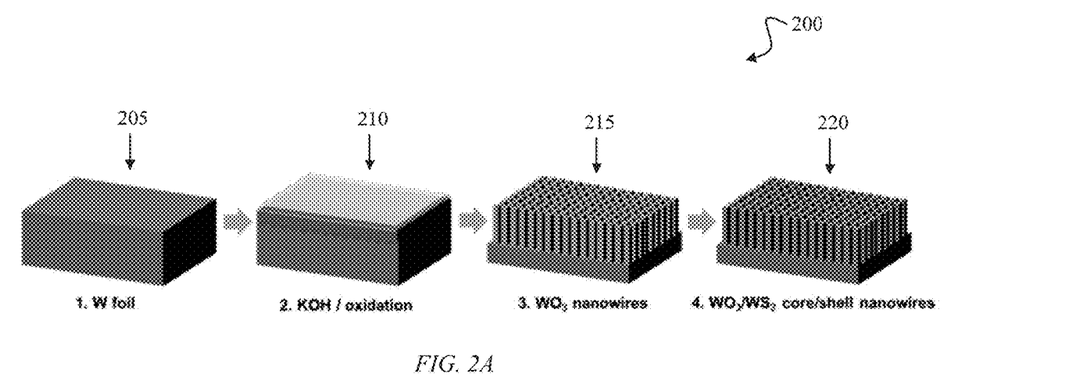
FIG. 2A is a schematic illustration of the fabrication process of h-$WO_3$/$WS_2$ core/shell nanowires on a W foil, in accordance with an embodiment of the present invention.

FIG. 2A is a schematic illustration for a fabrication process 200 of the core/shell nanowires of the present invention. The fabrication starts with the preparation of a metal current collector tungsten (W) foil 205, which is sequentially converted to W-based core/shell nanowires.

The W foil is drop-casted with potassium hydroxide (KOH) and is subsequently oxidized at 650° C. 210, which leads to the formation of vertically aligned, single-crystalline $WO_3$ nanowires in hexagonal (h—) structures 215. The nanowires are then sulfurized in a chemical vapor deposition (CVD) furnace under sulfur (S) environment, which converts the outer surface of the h-$WO_3$ nanowires to 2D $WS_2$ 220. Accordingly, entire supercapacitor components are seamlessly connected as they are chemically converted from the same material without requiring the physical addition of extra materials.

In a specific embodiment, the preparation of the nanowire of the present invention was carried out in two steps. In the first step, an array of vertically aligned h-$WO_3$ nanowires was prepared on top of a thin (50 µm) W foil by its oxidation. First, the W foil was sequentially cleaned in an ultrasonic bath with acetone, hydrochloric acid, ethanol, and deionized water. A 10 wt. % KOH solution was drop-casted on the top surface of the foil followed by spin coating at 2000 rpm. Then, the foil was kept in a thermal furnace which was subsequently heated up from room temperature to 650° C. at a ramp rate of 12° C./min. The furnace was held for 2 h (dwell time) at atmospheric pressure, followed by a natural cool-down to room temperature. The sample was taken out of the furnace followed by rinsing in DI water and drying at room temperature.

The sample (h-$WO_3$ nanowires on W foil) was subsequently placed in the heating zone of a home-built CVD system equipped with a 1 in. diameter quartz tube furnace. A ceramic boat containing pure sulfur (99.99% purity, Sigma-Aldrich) was placed inside the quartz tube located at the upstream of the CVD. The tube was then pumped down to a pressure of $10^{-3}$ mTorr and flushed with argon (Ar) gas repeatedly to guarantee a favorable growth atmosphere. With a flow of Ar (200 standard cubic centimeters per minute (sccm), the furnace was heated up to 850° C. at a rate of 20° C./min and was held for 40 min, followed by natural cooling.

For the plane-view TEM sample preparation, individual nanowires on W foils were directly transferred to lacey-carbon-coated Cu grids (Ted Pella) by gently rubbing them against the grids. For the cross-sectional TEM sample preparation, as-prepared nanowires were first coated with an amorphous carbon film of 100 nm thickness to protect their surfaces. Then, cross-sectioning of the sample was performed by a focused ion beam (FIB: Quanta 2D FEG, FEI) using a Ga ion milling (30 keV) and a platinum (Pt) deposition until the target area becomes electron transparent (~80 nm thick).

The prepared sample was transferred to a Cu TEM grid by a micromanipulator (Omniprobe) inside the FIB. ADF-STEM characterizations were performed with JEOL ARM200F TEM/STEM with a spherical aberration corrector (CEOS GmbH) and an electron probe (size of ~1 Å) at 200 kV. STEM-EDS characterizations were carried out with EDAX detector (SDD type 80T), and chemical analysis was performed with a analysis software (AZtecTEM, Oxford).

The electrochemical measurements were conducted in 0.1M $Na_2SO_4$, $H_2SO_4$, KCl, and LiCl electrolytes. For the three electrode tests, an array of core/shell nanowires on a W foil (area: 1 cm$^2$) was used as the working electrode, silver/silver chloride (Ag/AgCl) or saturated calomel as the reference electrode, and a Pt foil as the counter electrode. Two electrode tests were performed by assembling two batches of the nanowires on W foils as positive and negative electrodes. CV, GCD, and EIS tests were performed on a SP-150 electrochemical workstation (Bio-Logic, USA).

Figure 2B:
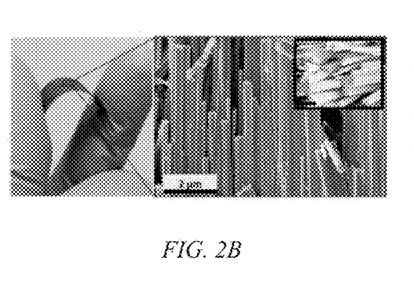
FIG. 2B is an optical image of as-prepared core/shell nanowires on a W foil under mechanical bending (left) and a corresponding SEM image (right) showing high-density, well-aligned nanowires along with their faceted surface (inset). The scale bar in the inset is 500 nm.
Figure 2C:
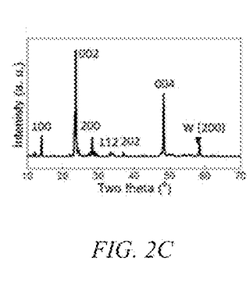
FIG. 2C illustrates an XRD pattern from as-prepared h-$WO_3$/$WS_2$ core/shell nanowires on a W foil, in accordance with an embodiment of the present invention.
Figure 2D:
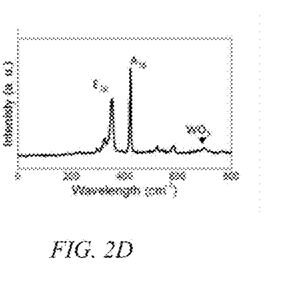
FIG. 2D illustrates a Raman spectra from as-prepared h-$WO_3$/$WS_2$ core/shell nanowires on a W foil, in accordance with an embodiment of the present invention.
Figure 2E:
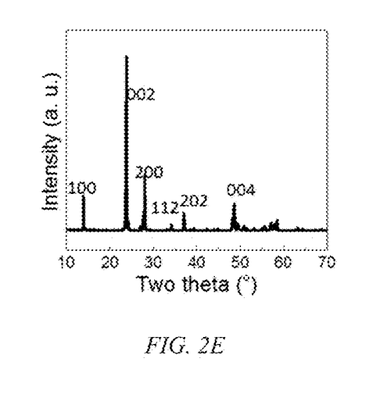
FIG. 2E is an XRD spectrum from h-$WO_3$ nanowires on a W foil prior to sulfurization, in accordance with an embodiment of the present invention.
Figure 2F:
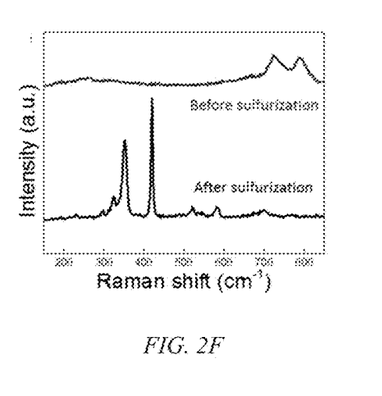
FIG. 2F is a Raman spectra from h-$WO_3$ nanowires on a W foil before and after sulfurization, in accordance with an embodiment of the present invention.

The morphology of the h-$WO_3$/$WS_2$ core/shell nanowires of the present invention can be characterized with scanning electron microscopy (SEM), X-ray diffractometer (XRD), and Raman spectroscopy. FIG. 2B shows an image of as-prepared core/shell nanowires on a W foil under bending (left) and its corresponding SEM image (right). The SEM image reveals highly dense, well-aligned nanowires with diameters of 150-200 nm and lengths of ~8-10 µm, leading to an aspect ratio as high as ~50. FIG. 2C shows the XRD pattern of the as-prepared core/shell nanowires on the W foil. Most of the distinguishable XRD peaks can be indexed to the standard diffraction pattern of single-crystalline h-$WO_3$ without any impurities, consistent with previous reports. A small peak observed at $2\theta=57.8°$ can be attributed to the (200) lattice planes of pure W, which must be originated from the W foil. The absence of XRD peaks corresponding to 2D $WS_2$ layers is obvious because of the small thickness of 2D $WS_2$, (thus, difficult to be detected by XRD), and details are discussed and confirmed in proceeding sections. The XRD pattern of h-$WO_3$ nanowires prior to sulfurization is illustrated in FIG. 2E. The structural quality of h-$WO_3$/$WS_2$ core/shell nanowires was further characterized by the Raman spectroscopy under 532 nm laser attained at room temperature. FIG. 2D shows the Raman spectra collected from h-$WO_3$/$WS_2$ nanowires on a W foil, revealing the presence of $WS_2$ which was not detected by XRD. The Raman bands centered at 420.1 and 351 cm$^{-1}$ confirm the W—S stretching from the $WS_2$ corresponding to $A_{1g}$ and $E'_{2g}$ vibration modes, respectively. Apparently, Raman spectra reveals some additional peaks at 323.7 and 581.8 cm$^{-1}$, which are indicative of the first-order and second order Raman modes of 2D $WS_2$. A small peak at ~700 cm$^{-1}$ originates from the stretching modes of O—W—O bonds, indicating the presence of h-$WO_3$ along with $WS_2$. Indeed, the Raman characterization of as-prepared h-$WO_3$ nanowires before sulfurization more clearly reveals the stretching modes of O—W—O bonds, as shown in FIG. 2F, which is also consistent with previous studies.

Figure 3A:
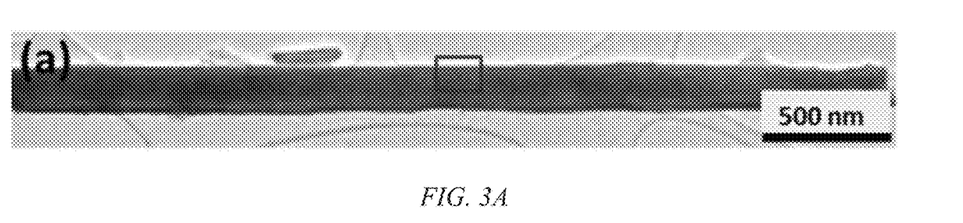
FIG. 3A illustrates the low-magnification plane-view BF-TEM characterizations of the crystalline structures of h-$WO_3$/$WS_2$ core/shell nanowires, in accordance with the present invention.
Figure 3B:
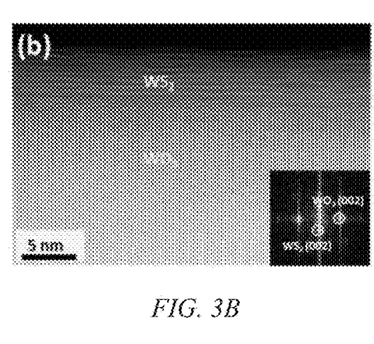
FIG. 3B illustrates the ADF-STEM image of the nanowire corresponding to the boxed region in FIG. 3A. The inset shows the corresponding fast Fourier transform (FFT) where $WS_2$ (002) and h-$WO_3$ (002) crystalline planes are indexed.
Figure 3C:
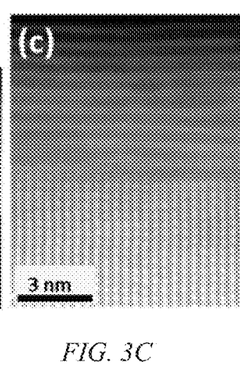
FIG. 3C illustrates the ADF-STEM image to show a stack of 2D $WS_2$ shell on the h-$WO_3$ core and an atomically sharp h-$WO_3$/$WS_2$ interface, in accordance with an embodiment of the present invention.

To elucidate the crystalline structure and the interface morphology of the h-$WO_3$/$WS_2$ core/shell nanowires, various transmission electron microscopy (TEM) characterizations were performed. FIG. 3A shows the low-magnification bright-field (BF) TEM image of an isolated nanowire, revealing its uniform diameter (~200 nm) along its entire length (>6 µm). FIG. 3B and FIG. 3C contain plane-view dark-field (DF) TEM images which zoom-in on the boxed region in FIG. 3A, depicting the detailed crystallinity of the nanowire in a side view. The crystalline structure of the nanowire is investigated in detail by annual dark-field (ADF) high-resolution TEM (HRTEM) in a scanning TEM (STEM) mode. The ADF STEM image in FIG. 3B indicates that the nanowire is composed of two components: (1) highly single-crystalline h-$WO_3$ core, which maintains its crystallinity throughout the entire nanowire length along the [001] axis of h-$WO_3$ and (2) 2D $WS_2$ shell with a uniform thickness of 7-8 nm outside of the h-$WO_3$ core. The zoomed-in ADF-STEM image in FIG. 3C further shows that the shell is composed of 2D $WS_2$ layers with uniformly spaced 2D layers as well as the atomically sharp core/shell interface of h-$WO_3$/$WS_2$.

Figure 3D:
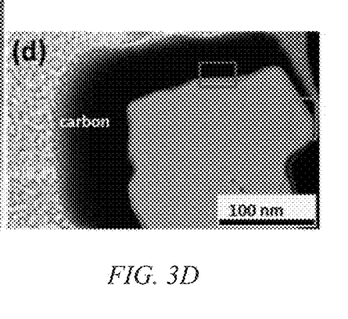
FIG. 3D illustrates cross-sectional TEM characterizations for low-magnification ADF-TEM image of a cross-sectioned h-$WO_3$/$WS_2$ core/shell nanowires, in accordance with an embodiment of the present invention.
Figure 3E:
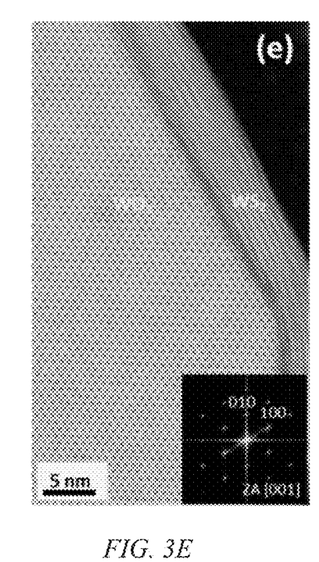
FIG. 3E illustrates cross-sectional TEM characterizations for ADF-STEM images of the cross-sectioned nanowire corresponding to a first boxed region revealing the conformal growth of 2D $WS_2$ on the h-$WO_3$. The inset of FIG. 3E shows an indexed FFT obtained from the core h-$WO_3$ region in [001] zone axis.
Figure 3F:
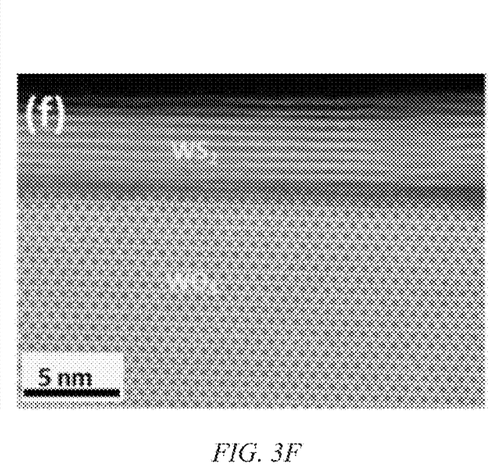
FIG. 3F illustrates cross-sectional TEM characterizations for ADF-STEM images of the cross-sectioned nanowire corresponding to a second boxed region revealing the conformal growth of 2D $WS_2$ on the h-$WO_3$.

The morphology of the h-$WO_3$/$WS_2$ core/shell nanowire is further investigated by cross-sectional TEM characterizations. FIG. 3D is the low magnification ADF-STEM image of a cross-sectioned h-$WO_3$/$WS_2$ nanowire, and FIG. 3E and FIG. 3F contain the high-resolution ADF-STEM images corresponding to the first and second boxed regions in FIG. 3D, respectively. The images reveal that 2D $WS_2$ is uniformly grown in stacks of ~8-9 layers throughout the entire periphery of the h-WO$_3$ core in a conformal manner, consistent with the plane-view TEM analysis.

Figure 3G:
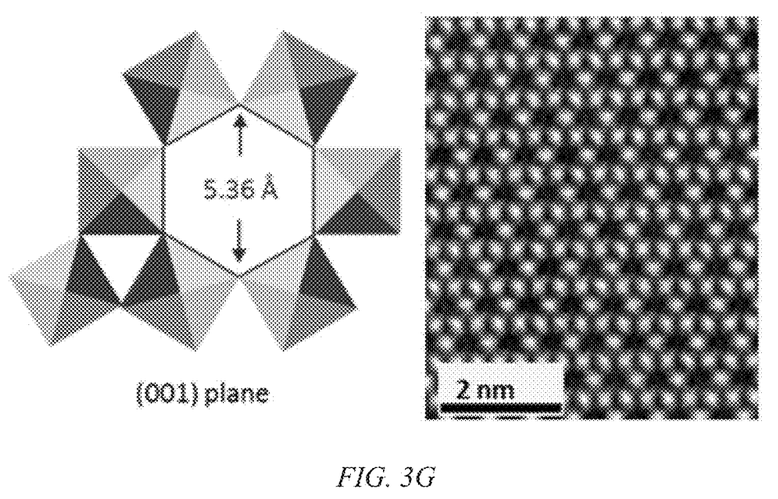
FIG. 3G is a cross-sectional view of the nanowire revealing the crystalline structure on its (001) basal plane, in accordance with an embodiment of the present invention.
Figure 3H:
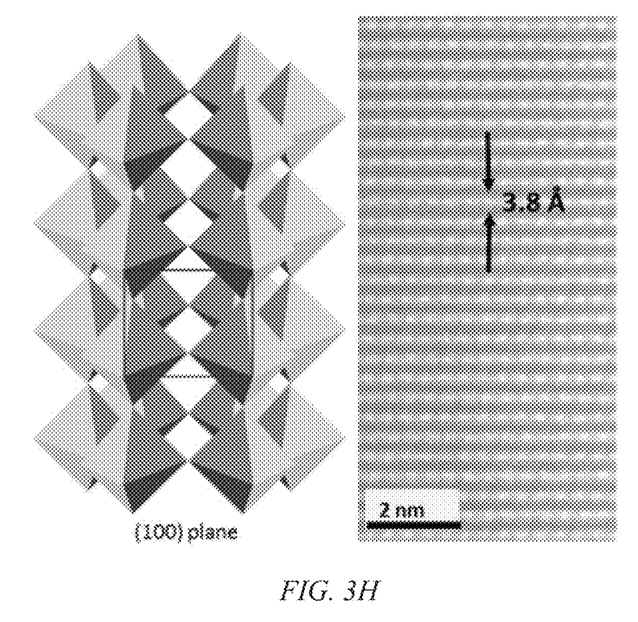
FIG. 3H is a projected-view of the nanowire along its length corresponding to the c-axis of h-$WO_3$, in accordance with an embodiment of the present invention.
Figure 4A:
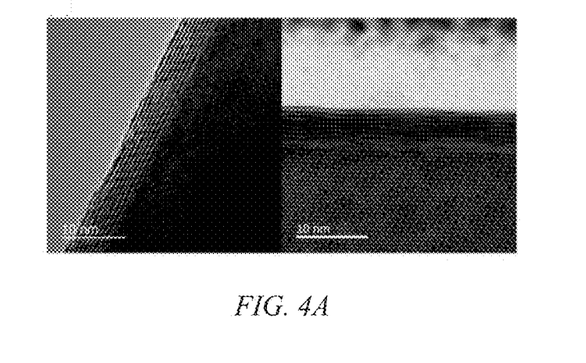
FIG. 4A is a TEM characterization of the core/shell nanowires of the present invention in a bright-field plane view (left) and a cross-sectional view (right). HRTEM images show the crystalline structures at the interfaces of h-$WO_3$/$WS_2$.
Figure 4B:
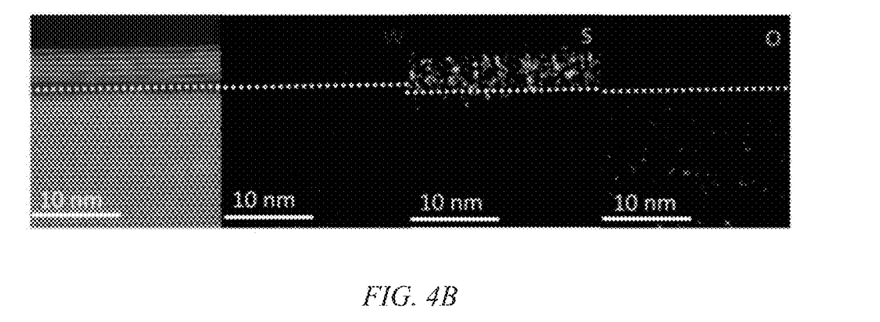
FIG. 4B is a TEM characterization of the core/shell nanowires of the present invention wherein STEM-EDS elemental images show the elemental distribution of the nanowires.
Figure 4C:
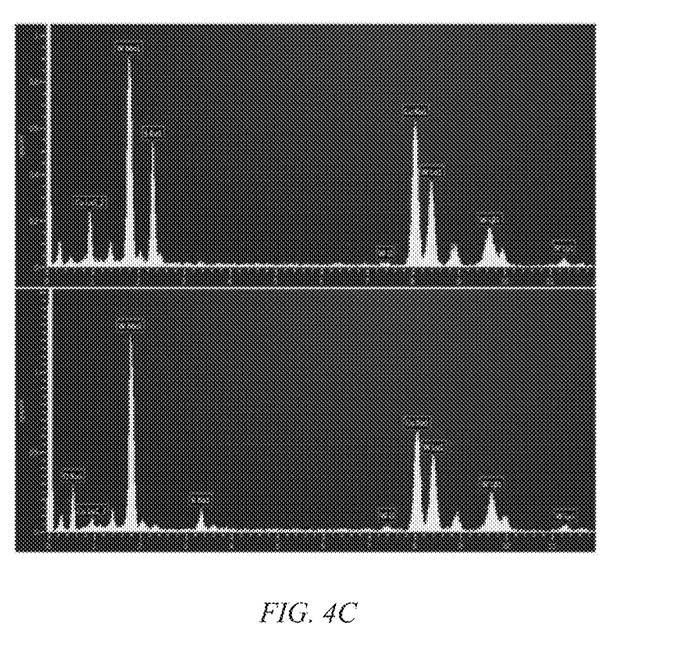
FIG. 4C illustrates EDS spectra collected from the shell (top) and the core (bottom) regions in FIG. 4B.

FIG. 3G and FIG. 3H visualize the crystalline structure of the h-WO$_3$ core nanowire in schematic views and corresponding ADF-STEM images. The left-hand portion of FIG. 3G shows a schematic view of h-WO$_3$ constructed by the arrangement of the six tungsten oxide (W—O$_6$) octahedral by sharing their corners along the [001] zone axis. The image indicates the presence of open hexagonal areas (~5.36 Å in diagonal) on its basal plane along c-axis, which is confirmed by the corresponding ADF-STEM image in the right-hand portion of FIG. 3G. The stacking of such crystalline units along the c-axis suggests that core h-WO$_3$ nanowires possess long 1D hexagonal open channels along their lengths, as shown by the projected schematic image in the left-hand portion of FIG. 3H. The ADF-STEM image in the right-hand portion of FIG. 3H, corresponding to the schematic, shows a lattice spacing of ~3.8 Å which corresponds to (002) planes in h-WO$_3$, consistent with previous studies. These open 1D channels are the intrinsic features of h-WO$_3$ compared to other phases such as monoclinic (m–) WO$_3$, and their advantages for pseudo capacitive reactions via enhanced ion/carrier transports have previously been suggested elsewhere. The morphology of the h-WO$_3$/WS$_2$ interface was also investigated by BF-HRTEM and energy dispersive X-ray spectroscopy (EDS)-STEM characterizations, as shown in FIG. 4A through FIG. 4C. The BF-HRTEM images shown in FIG. 4A also confirm the atomically sharp h-WO$_3$/WS$_2$ interface, indicating the conformal growth of 2D WS$_2$ layers on top of the outer surface of the h-WO$_3$ core. The EDS elemental mapping images, shown in FIG. 4B, reveal the localized distribution of W, O, and S throughout the nanowire, further supporting the core/shell structure. The EDS spectra, shown in FIG. 4C collected from each core and shell indicate the stoichiometric distribution of the elements in the corresponding regions.

Figure 5A:
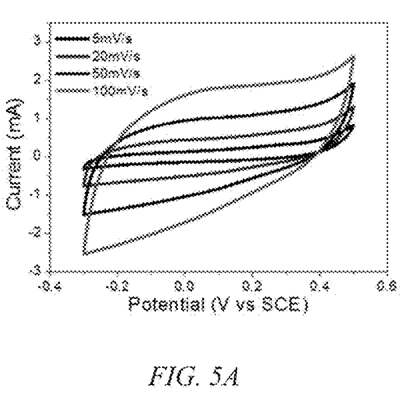
FIG. 5A illustrates CV curves of h-$WO_3$/$WS_2$ core/shell nanowires on a W foil in 0.1M $Na_2SO_4$ electrolyte at various scan rates, in accordance with an embodiment of the present invention.
Figure 5B:
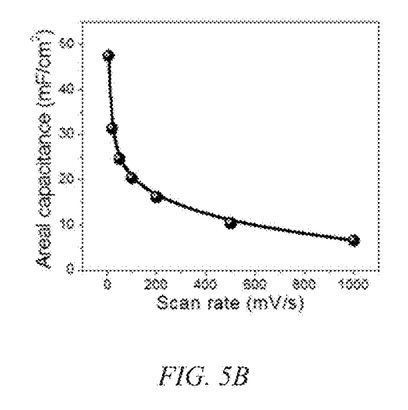
FIG. 5B illustrates the trend of change in areal capacitance value of h-$WO_3$/$WS_2$ core/shell nanowires in a W foil in 0.1M $Na_2SO_4$ electrolyte as a function of the various scan rates, in accordance with an embodiment of the present invention.

The electrochemical performance of the h-WO$_3$/WS$_2$ core/shell nanowire on a W foil (effective area: 1 cm$^2$) was evaluated in a three-electrode geometry using 0.1M sodium sulfate (Na$_2$SO$_4$) solution as an electrolyte and the backside of the W foil as a current collector. FIG. 5A shows the typical cyclic voltammetry (CV) curves of the core/shell nanowire electrode recorded at various scan rates, ranging from 5 to 100 mV/s in a voltage window of –0.3 V to 0.5 V. The CV curves exhibit near symmetrical loops for all the scan rates, indicative of dominant EDLC reactions over faradic adsorptions. However, the deviation from the ideal rectangular CV profile suggests some extent of redox reactions of alkali metal ions (Na$^+$) intercalated into the van der Waals gaps of 2D WS$_2$ at the various valence states of W, following WS$_2$+Na$^+$+e$^-$=WS—Na$^+$ as previously suggested. Based on the CV curves, the specific areal capacitance of the nanowires was calculated as a function of scan rates, as shown in FIG. 5B.

Areal capacitance (C$_A$) of an electrode is the capacitance per unit area of one electrode. The areal specific capacitance is calculated as:

$$C_A = \frac{C_{electrode}}{A}$$

where A (cm$^2$) is the total area of the electrode. In CV measurements, C$_{electrode}$ is calculated from:

$$C_{electrode} = \frac{1}{(2 \times \Delta V \times v_0)} \int_a^b (|I_{WS_2@h-WO_3}|)dV$$

where, I is the current, V is the voltage, ΔV is the voltage window, v$_0$ is the scan rate, a and b are voltage window boundaries. In GCD measurements, capacitance can be computed as:

$$C_{electrode} = \frac{I \times (\Delta t_{WS_2@h-WO_3})}{\Delta V}$$

where, I is the discharge current, Δt is the discharge time, and ΔV is the voltage difference of discharge (obtained from the discharge curve excluding the voltage drop).

Cell capacitance (C$_{cell}$) is calculated from the discharge curve of GCD measurements using the following equation:

$$C_{cell} = \frac{I \times \Delta t}{\Delta V}$$

where, I is the discharge current, Δt is the discharge time, and ΔV is the voltage difference of discharge (obtained from the discharge curve excluding the voltage drop).

Areal specific capacitance (C$_{asc}$) of the device can be calculated as:

$$C_{asc} = \frac{C_{cell}}{A}$$

where A (cm$^2$) is the total area of the device.

The energy density (E) and power density (P) can be calculated as follows:

$$E = \frac{1}{2 \times 3600} \times C_{asc} \times \Delta V^2$$

$$P = \frac{E}{\Delta t}$$

where, C is the areal specific capacitance of the device, ΔV is the voltage difference of discharge and Δt is the discharge time.

Figure 6A:
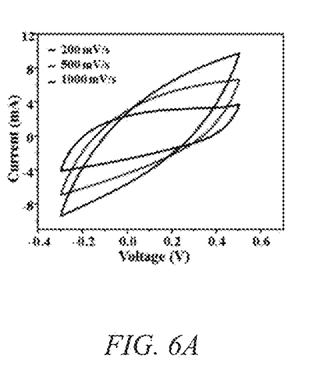
FIG. 6A illustrate C-V curves obtained at different scan rates of 200, 500, and 1000 mV/s for the core/shell nanowires of the present invention.
Figure 6B:
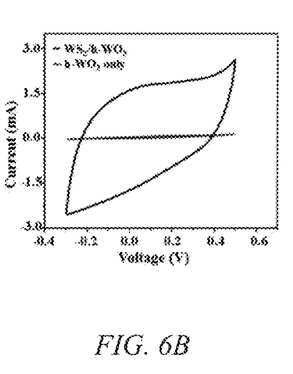
FIG. 6B illustrates a comparison of the C-V performance between h-$WO_3$/$WS_2$ core/shell nanowires and h-$WO_3$ nanowires.

Higher capacitance values were obtained with lowering scan rates in the tested range of 5 mV/s to 1000 mV/s, for example, 47.5 mF/cm$^2$ at 5 mV/s and 33 mF/cm$^2$ at 10 mV/s. These values are much higher than those from previously developed stand-alone 2D TMD-based supercapacitors and their composites obtained at comparable scan rates; such as, liquid-exfoliated MoS$_2$ sheets (2.4 mF/cm$^2$ at 10 mV/s), edge oriented-MoS$_2$ (12.5 mF/cm$^2$ at 50 mV/s), 3D porous MoS$_2$ (~33.0 mF/cm$^2$ at 5 mV/s), metallic (1T)-WS$_2$ (2813 μF/cm$^2$) and semiconducting (2H)-WS$_2$ (223.3 μF/cm$^2$ at 10 mV/s), and MoS$_2$-graphene composite (1 1 mF/cm$^2$ at 5 mV/s). As the scan rate increases beyond 200 mV/s, the CV curves start to display skewed rectangular loops deviating from the symmetric shapes, as shown in FIG. 6A, attributed to the more active accumulation of ions onto the electrode surfaces. For comparison, pristine h-WO$_3$ nanowires prior to sulfurization were also tested under CV measurements, as shown in FIG. 6B. The plots show 2 orders of magnitude lower capacitance for the pristine state in comparison to the core/shell structure, indicating that the 2D $WS_2$ shell is critically responsible for enhancing the capacitive performance.

Figure 5C:
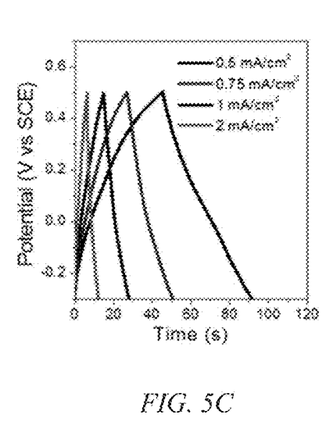
FIG. 5C illustrates GCD curves of h-$WO_3$/$WS_2$ core/shell nanowires on a W foil in 0.1M $Na_2SO_4$ at various current densities, in accordance with an embodiment of the present invention.
Figure 5D:
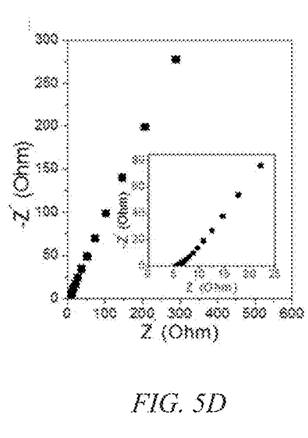
FIG. 5D illustrates a Nyquist plot for h-$WO_3$/$WS_2$ core/shell nanowires on a W foil in 0.1M $Na_2SO_4$ and its corresponding zoomed-in image near at $-Z''=0\Omega$, in accordance with an embodiment of the present invention.
Figure 5E:
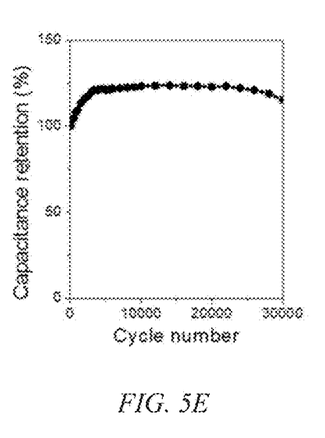
FIG. 5E illustrates the cyclic performance measured at 100 mV/s for h-$WO_3$/$WS_2$ core/shell nanowires on a W foil in 0.1M $Na_2SO_4$, in accordance with an embodiment of the present invention.
Figure 6C:
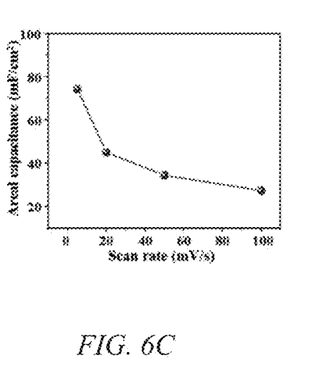
FIG. 6C illustrates the areal capacitance obtained at various scan rates after 2500 cycles for the core/shell nanowires of the present invention.
Figure 8A:
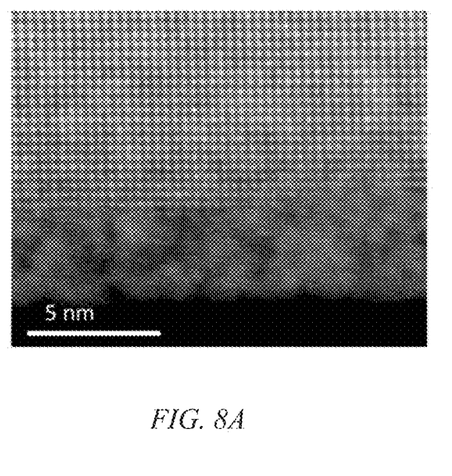
FIG. 8A is a graphical illustration of an ADF-STEM image of a h-$WO_3$/$WS_2$ core/shell interface after 30,000 charge-discharge cycles.
Figure 8B:
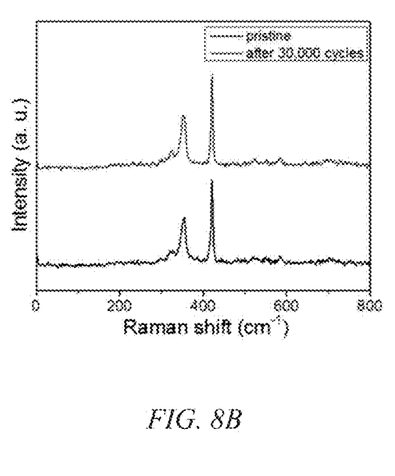
FIG. 8B is a graphical illustration of Raman characterizations of h-$WO_3$/$WS_2$ core/shell nanowires before/after 30,000 charge-discharge cycles.

Galvanostatic charge-discharge (GCD) curves of the core/shell nanowires were recorded at various current densities in the voltage range of −0.3V and 0.5 V, as shown in FIG. 5C. Consistent with the CV curves, the GCD curves also show nearly symmetrical voltage curves, indicating highly reversible and fast responses. The electrochemical impedance spectroscopy (EIS) measurements were carried out to further assess the carrier transport efficiency of the nanowires, as shown in FIG. 5D. The Nyquist plot in FIG. 5D shows nearly linear and vertical characteristics, an indication of superior electrochemical performance. A low equivalent series resistance (ESR=5.1Ω), as calculated from the GCD curves, confirms the low internal resistance and high-rate capacitive behavior of the core/shell nanowires. FIG. 5E shows the cyclic stability of the core/shell nanowire recorded up to 30,000 charge-discharge cycles at a scan rate of 100 mV/s. It is interesting to note that the capacitance gradually increases up to ~2500 cycles and remains nearly constant throughout the entire measurement. The initial increase of the capacitance is attributed to the 2D $WS_2$ shell becoming more electrochemically active with increasing cycles, as the number of 2D layers that meet the electrolyte increases. A high areal capacitance of 74.25 mF/cm² was observed (scan rate: 5 mV/s) after 2500 cycles, as shown in FIG. 6C, which surpasses the performance of all the previously reported 2D TMDs-based supercapacitors and is comparable to the state-of-the-art carbon-based supercapacitors. Although a slight decay of capacitance is observed after ~2500 cycles, the overall cyclic stability is well retained throughout further extended cycles, resulting in zero loss of initial capacitance even at 30,000 cycles. This high-capacitance retention is superior to most of the previously developed 2D TMDs-based supercapacitor electrodes (Table 1), and it is believed that this is due to the excellent mechanical stability of the nanowires benefiting from their one-body geometry and seamless heterointerfaces. Indeed, TEM characterizations of core/shell nanowires which underwent >30,000 cycles reveal that the nanowires still maintain atomically sharp core/shell interfaces and highly single-crystalline $h-WO_3$, while 2D $WS_2$ shells turned partially amorphized, as shown in FIG. 8A. Raman characterizations of identical core/shell nanowires before and after 30,000 charge-discharge cycles do not reveal any noticeable changes in peak positions and relative intensities, further confirming the structural and chemical robustness of the nanowires, as shown in FIG. 8B.

TABLE 1

Comparison of Cyclic Performances of 2D TMD-Based Supercapacitors

| material | electrolyte | retention (%) | no. of cycles | scan rate/ current density | ref |
|---|---|---|---|---|---|
| $WS_2$/rGO | KOH (0.5M) | 98.6 | 5000 | 2 A/g | 54 |
| 1T-2H-hybrid $MoS_2$ | KOH (6M) | 92.2 | 1000 | 0.5 A/g | 55 |
| $WS_2$ nanoparticle/ amorphous CNT | KOH (3M) | 60 | 500 | 10 A/g | 27 |
| edge-oriented $MoS_2$ | $H_2SO_4$ (0.5M) | 83 | 20,000 | 50 mV/s | 48 |
| $MoS_2$-graphene | $Na_2SO_4$ (1M) | 92.3 | 1000 | 1 A/g | 57 |
| $WS_2$/ SWCNT hybrid | $LiPF_6$ (1M) | 47 | 500 | 10 mV/s | 26 |
| 1T $WS_2$ nanoribbons | $H_2SO_4$ (3M) | 33 | 2000 | 10 mV/s | 49 |
| mesoporous $MoS_2$ | $Na_2SO_4$ (1M) | 80 | 2000 | 150 mV/s | 58 |
| 1T $MoS_2$ | $Na_2SO_4$ (0.5M) | ≥93 | 5000 | 2 A/g | 59 |
| $MoS_2$/ Ppy | KCl (1M) | 85 | 4000 | 1 A/g | 60 |
| $MoS_2$/ MWNT | $Na_2SO_4$ (1M) | 95.8 | 1000 | 1 A/g | 61 |
| 3D $MoS_2$/ PANI | $H_2SO_4$ (1M) | 79 | 6000 | 1 A/g | 29 |
| $MoS_2$/carbon | $Na_2SO_4$ (1M) | 94.1 | 1000 | 1.6 A/g | 62 |
| $h-WO_3/WS_2$ nanowire | $Na_2SO_4$ (0.1M) | ≥100 | 30,000 | 100 mV/s | this work |

Figure 7A:
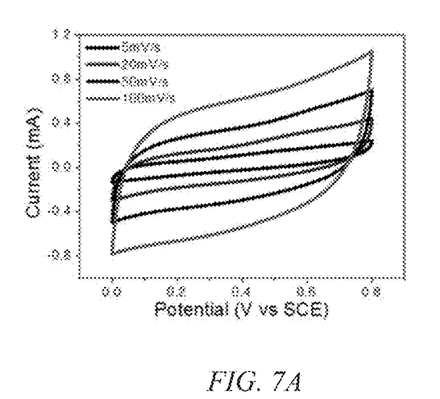
FIG. 7A is a graphical illustration of CV curves at various scan rates to show the electrochemical performance of solid-state core/shell nanowire supercapacitors, in accordance with an embodiment of the present invention.
Figure 7B:
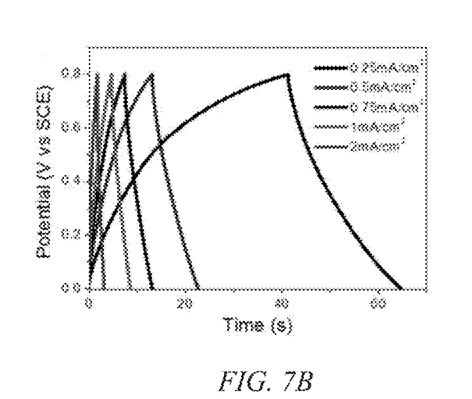
FIG. 7B is a graphical illustration of GCD curves at various current densities to show the electrochemical performance of solid-state core/shell nanowire supercapacitors, in accordance with an embodiment of the present invention.
Figure 9A:
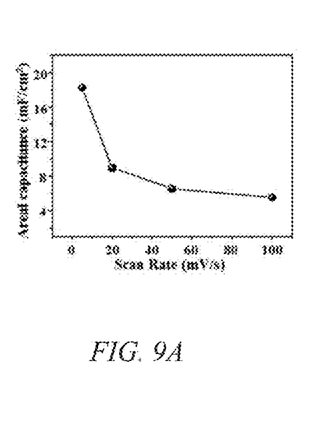
FIG. 9A is a graphical illustration of areal capacitance vs. scan rate for a supercapacitor assembled with two electrodes of core/shell nanowires on W foils, in accordance with an embodiment of the present invention.
Figure 9B:
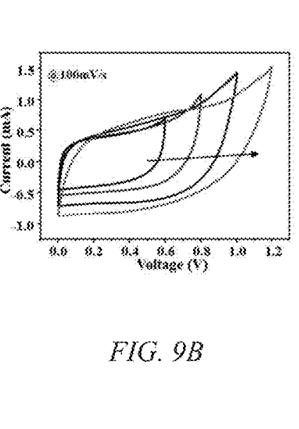
FIG. 9B is a graphical illustration of higher operation voltage windows at a scan rate of 100 mV/s for the corresponding supercapacitor shown in FIG. 10A.
Figure 9C:
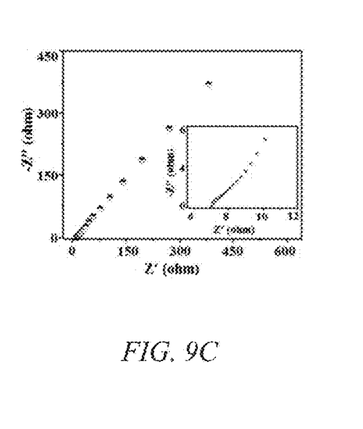
FIG. 9C is a Nyquist plot of the corresponding supercapacitor in accordance with an embodiment of the present invention.

A comparison for the cyclic stabilities of 2D TMDs-based supercapacitor electrodes is summarized in Table 1. The performance of solid-state supercapacitors assembled with two identical core/shell nanowires on W foils and $Na_2SO_4$ electrolyte gel in two-electrode geometry was also tested. FIG. 7A shows CV curves collected at various scan rates ranging from 5 to 100 mV/s in a voltage window of 0-0.8 V, exhibiting nearly symmetric shapes. The areal capacitance as a function of scan rate is shown in FIG. 9A. The solid-state device achieved a maximum areal capacitance of 18.3 mF/cm² at a scan rate of 5 mV/s, which is much higher than other 2D material-based devices fabricated by various methods, such as spray painted $MoS_2$ nanosheets (8 mF/cm²), onion like carbon and graphene-based micro supercapacitors (0.5-3 mF/cm²), and activated carbon capacitors (13.5 μF/cm²). The CV curves of the nanowire supercapacitor were also collected with different voltage windows at 100 mV/s, as shown in FIG. 9B, demonstrating their stable performance even at a higher voltage. The GCD curves obtained at various current densities in FIG. 7B show nearly triangular shapes, suggesting a fast charge-discharge process. The Nyquist plots, as shown in FIG. 9C, exhibit nearly a vertical line in the low-frequency region with a low ESR (~6.9Ω: inset), indicative of excellent capacitive behavior and good conductivity.

Figure 7C:
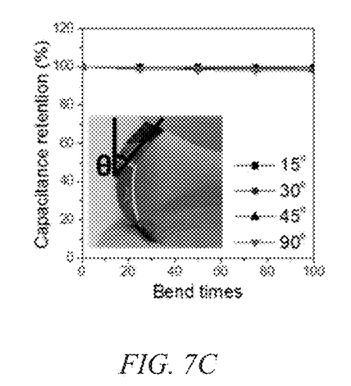
FIG. 7C is a graphical illustration of capacitance retention under repeated mechanical deformations at various bending angles to show the electrochemical performance of solid-state core/shell nanowire supercapacitors, in accordance with an embodiment of the present invention.
Figure 7D:
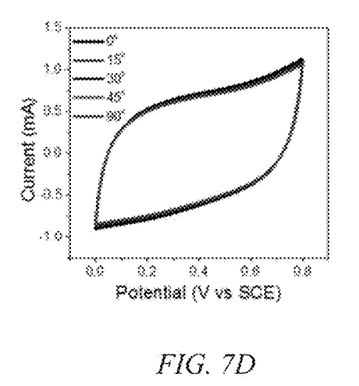
FIG. 7D is a graphical illustration of CV curves obtained at different bending angles (0°-90°) to show the electrochemical performance of solid-state core/shell nanowire supercapacitors, in accordance with an embodiment of the present invention.
Figure 7E:
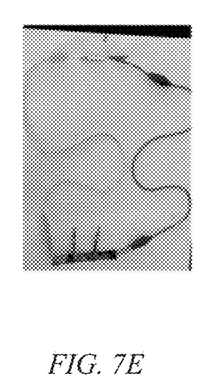
FIG. 7E is demonstration of solid-state core/shell nanowire supercapacitor powering an LED, in accordance with an embodiment of the present invention.
Figure 7F:
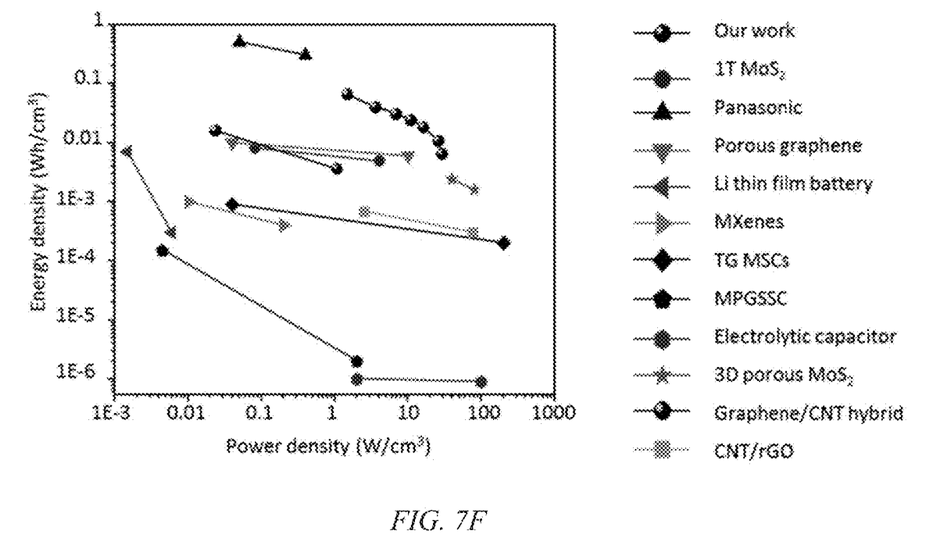
FIG. 7F is a Ragone plot comparing the performances of various technologies with the core/shell nanowire supercapacitor, in accordance with an embodiment of the present invention.

The electrochemical performance of the solid-state nanowire supercapacitor under mechanical deformation was tested by folding it at various angles ranging from 15° to 90°. FIG. 7C shows that the supercapacitor remained over 98% of its initial capacitance even after folding at 90° for 100 times, revealing its excellent bendability. FIG. 7D confirms that CV characteristics are well maintained even under the repeated mechanical bending of the nanowire supercapacitor. A demonstration of lighting a light-emitting diode (LED) using nanowire supercapacitors is shown in FIG. 7E. Three solid-state nanowire supercapacitors (1 mm×3 mm) connected in series are used, charging up the LED at 1.6 V. Lastly, FIG. 7F presents a Ragone plot to compare the energy vs power densities of our core/shell nanowires with other stand-alone 2D materials, including 2D transition-metal carbides/nitrides/carbonitrides (MXenes) and porous graphene as well as various energy storage devices. The maximum energy density of the core/shell structure in this work is 0.06 Wh/cm$^3$, which outperforms almost all the state-of-the-art technologies, such as lithium thin-film batteries, porous graphene, electrolytic capacitors, and recently developed MXenes and metallic 1T MoS$_2$.

Figure 10:
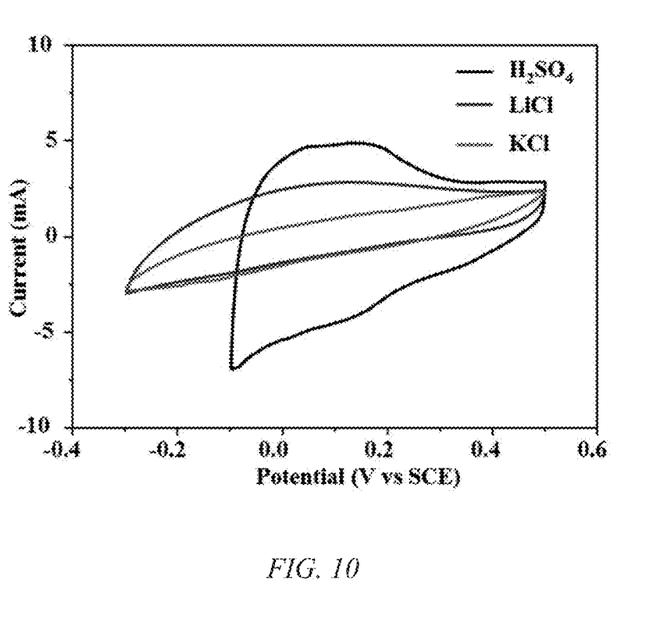
FIG. 10 is a graphical illustration of the electrochemical properties of nanowires in various electrolytes showing C-V curves of h-$WO_3$/$WS_2$ core/shell nanowires in various electrolytes at a scan rate of 100 mV/s.

The excellent electrochemical properties of the core/shell nanowires are mainly attributed to EDLC mechanism, but the possibility of pseudo capacitive reactions cannot be completely ruled out. To test this hypothesis and better clarify the governing mechanism, we examine the CV behaviors of the core/shell nanowires in various electrolytes, such as sulfuric acid (H$_2$SO$_4$), lithium chloride (LiCl), and potassium chloride (KCl), as shown in FIG. 10. It is clear that the CV curves more significantly deviate from EDLC-type symmetric shapes, as the size of the cations in the electrolytes decreases (K$^+$>Li$^+$>H$^+$). This observation indicates enhanced pseudo capacitive reactions with smaller cations, as they are easier to get intercalated into the interlayers of 2D WS$_2$ shells. This result, together with the TEM evidence of deformed 2D WS$_2$ shells after extended cycles, suggests that the capacitive performances of the core/shell nanowires of the present invention are likely the combined results of EDLC and pseudo capacitive reactions, although quantitatively decoupling one from the other is technically challenging. Moreover, the outstanding cyclic stability of the inventive core/shell nanowires is attributed to the structural advantage of WS$_2$ shells whose interlayer spacing is significantly larger than the diameters of electrolyte ions (~3 times larger than that of Na$^+$ used in this study). The interlayer interaction between WS$_2$ layers is relatively weaker than those of other 2D TMDs with similar structures, which further enables the facile and reversible intercalation of ions into WS$_2$ shells without a significant distortion of 2D layers for a long period of cycles.

Accordingly, in various embodiments, the hybrid supercapacitors of the present invention outperform any previously developed stand-alone 2D TMD-based supercapacitors. In particular, the supercapacitors of the present invention exhibit an exceptional charge-discharge retention exceeding 30,000 cycles owing to their structural robustness, suggesting great potential for unconventional energy storage technologies.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all the generic and specific features of the invention herein described, and all statements of the scope of the invention which, as a matter of language, might be said to fall there between. Now that the invention has been described,

What is claimed is:

1. A supercapacitor comprising:
    an array of nanowires fabricated from a metal foil, each of the nanowires of the array comprising;
        a nanowire core formed by oxidizing the metal foil to form an oxidized metal foil; and
        a shell surrounding the nanowire core, the shell formed by sulfurizing the oxidized metal foil of the nanowire core to form a plurality of layers of sulfurized metal foil, each of the plurality of layers separated from each other by a sub-nanometer physical gap.

2. The supercapacitor of claim 1, wherein the metal foil is tungsten (W) foil.

3. The supercapacitor of claim 1, wherein the metal foil is about 50 µm thick.

4. The supercapacitor of claim 1, wherein the metal foil is flexible.

5. The supercapacitor of claim 1, wherein the nanowire core is a one-dimensional tungsten trioxide (WO$_3$) nanowire.

6. The supercapacitor of claim 1, wherein the nanowire core is a highly single-crystalline hexagonal tungsten trioxide (h-WO$_3$) nanowire.

7. The supercapacitor of claim 1, wherein the nanowires of the array are substantially vertically aligned.

8. The supercapacitor of claim 1, wherein the shell is a two-dimensional tungsten disulfide (WS$_2$) shell.

9. A supercapacitor comprising:
    an array of nanowires fabricated from a tungsten (W) foil, each of the nanowires of the array comprising;
        a one-dimensional hexagonal tungsten trioxide (h-WO$_3$) nanowire core; and
        a two-dimensional tungsten disulfide (WS$_2$) shell surrounding the nanowire core, the shell comprising a plurality of layers, each of the plurality of layers separated from each other by a sub-nanometer physical gap.

* * * * *